July 20, 1943.　　　　L. V. NOVAK　　　　2,324,717
BEEF CARCASS PROP
Filed Jan. 17, 1942

INVENTOR
Louis V. Novak
BY Sam J. Slotky
ATTORNEY

Patented July 20, 1943

2,324,717

UNITED STATES PATENT OFFICE 2,324,717

BEEF CARCASS PROP

Louis V. Novak, Sioux City, Iowa

Application January 17, 1942, Serial No. 427,149

3 Claims. (Cl. 17—44)

My invention relates to a prop for carcasses.

An object of my invention is to provide a prop which when placed against the outer hide of a carcass will not injure the same and yet support it in position, while the other side of the carcass is being skinned.

A further object of my invention is to provide a collapsible member associated with the prop which can be placed into operative position to support the already skinned side of the animal when the other side is to be skinned.

A further object of my invention is to provide a supporting prop which will support the skinned side without danger of the carcass falling, providing a sufficient grip for this purpose.

A further object of my invention is to provide a simple construction which can be quickly manipulated by simple movements for supporting the carcass on either desired side.

With these and other objects in view, my invention consists in the construction, arrangement, and combination of the various parts of my device, whereby the objects contemplated are attained, as hereinafter more fully set forth, pointed out in my claims, and illustrated in the accompanying drawing, in which:

Figure 1:
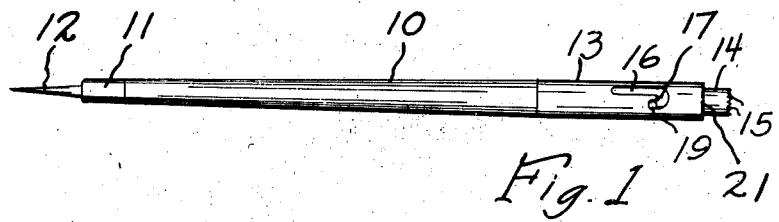
Figure 1 is a side elevation of the complete prop.

A principal objective of my invention is to provide a supporting prop for carcasses which will not require the use of any pointed or serrated members when being used against the hide of the creature in order to prevent tearing or cutting of the finished hide. Also I provide an arrangement which extends from the smooth hide supporting member to form a serrated structure which will support the smooth side of the creature.

I have used the character 10 to designate the tapered wooden or other bar to which is attached the metal ferrule 11 to which ferrule is attached the pointed member 12. At the other end of the rod 10 is attached a cylindrical tube 13 which slidably engages a further inner tube 14. The tube 14 at the extremity thereof includes a series of equally spaced substantially V shaped points 15 which extend around the end periphery thereof. The cylindrical tube 13 includes the substantially J shaped slot 16 which extends into the further arcuate portion 17 and the end portion 18.

Received within the slot 16 is the outwardly extending pin 19 which is attached to the inner tube 14 and which is adapted to travel within the slot 16. The tube 14 terminates at 20 to allow sufficient movement of the tube. The outer tube 13 terminates at the substantially flat abutment end 21. The device is used in the following manner.

Figure 2:
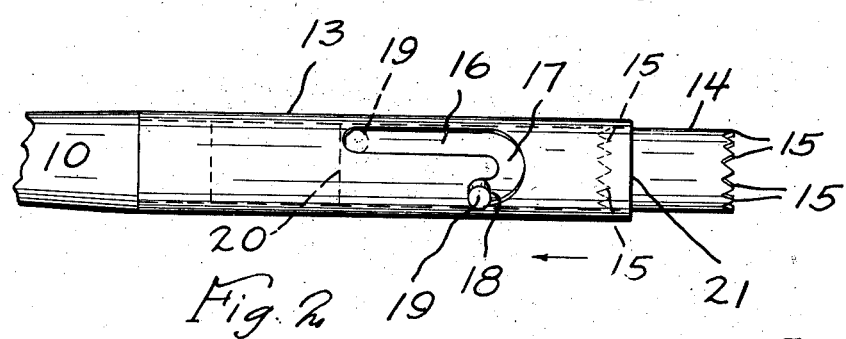
Figure 2 is a detail of the adjustable end portion.
Figure 3:
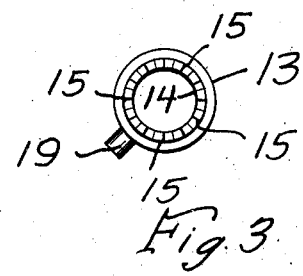
Figure 3 is a forward view of Figure 2.
Figure 4:
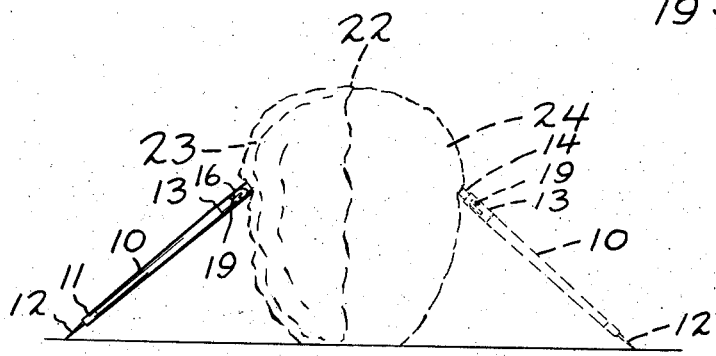
Figure 4 is a view of the prop as it is used.

As shown in Figure 4 the prop is placed against the carcass of the animal which carcass is indicated by the character 22 with the pin 19 at the lower or dotted position as shown in Figure 2 which carries the tube 14 inwardly with the teeth 15 inwardly of the portion 21. The prop is placed against the side of the carcass and against the hide thereof, said hide being indicated by the character 23. The hide has the tendency of gathering around the periphery of the end portion 21 with the portion 21 forming a natural cavity to support the carcass in a substantially vertical position and with portions of the hide also compressing inside of the end of the tube 13, the combined effect which is to support the animal without slipping.

Next, one side of the carcass is stripped or skinned, the skinned side being indicated by the character 24. After the side 24 is skinned the prop is then taken to the other side and is used as is shown by the dotted structure in Figure 4. It will be understood that the point 12 is placed in the floor for supporting the prop. When the prop is used on the skinned side or smooth side 24 preparatory to removing the other portion of the hide 23, the pin 19 is thrust outwardly and into the portion 18 of the slot 16 which is then retained and locked in such position against inward movement.

This operation carries the tube 14 outwardly in the position as shown in Figures 1, 2, and the dotted structure in Figure 4, and the points 15 are then placed against the smooth flesh portions of the creature. This also provides a natural grip to prevent slipping and supports the carcass while the other side is being skinned. The provision of the slot 16 allows the operator to throw the arrangement into outer or collapsed position by a simple forward and side movement of the wrist so that the operation can be performed quickly.

It will be now seen that I have provided all of the advantages contemplated in the objects of my invention with other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A beef carcass prop comprising a lengthened bar including a pointed end, said bar including a hollow tube at the further end thereof, said tube having a smooth end periphery adapted to bear against a carcass hide, and a further tube received within said tube and including a series of teeth about the end periphery thereof.

2. A beef carcass prop comprising a lengthened bar including a pointed end, said bar including a hollow tube at the further end thereof, said tube having a smooth end periphery adapted to bear against a carcass hide, and a further tube received within said tube and including a series of teeth about the end periphery thereof, means for telescopically receiving said further tube within said tube with the teeth thereof being below the level of said end periphery portion.

3. A beef carcass prop comprising a lengthend bar including a pointed end, said bar including a hollow tube at the further end thereof, said tube having a smooth end periphery adapted to bear against a carcass hide, a further tube received within said tube and including a series of teeth about the end periphery thereof, means for telescopically receiving said further tube within said tube with the teeth thereof being below the level of said end periphery portion, means for retaining said further tube outwardly with respect to said tube including a substantially J shaped slot, and a pin attached to said further tube received within said slot, said slot having an outer limiting portion for receiving said pin.

LOUIS V. NOVAK.